(12) United States Patent
Bengtsson et al.

(10) Patent No.: US 10,674,442 B2
(45) Date of Patent: Jun. 2, 2020

(54) SELECTING A CELL OF A WIRELESS CELLULAR COMMUNICATION NETWORK

(71) Applicant: Sony Corporation, Tokyo (JP)

(72) Inventors: Erik Bengtsson, Eslöv (SE); Rickard Ljung, Helsingborg (SE)

(73) Assignee: SONY CORPORATION, Tokyo (JP)

( * ) Notice: Subject to any disclaimer, the term of this patent is extended or adjusted under 35 U.S.C. 154(b) by 442 days.

(21) Appl. No.: 15/036,513

(22) PCT Filed: Nov. 25, 2014

(86) PCT No.: PCT/EP2014/075495
§ 371 (c)(1),
(2) Date: May 13, 2016

(87) PCT Pub. No.: WO2015/082252
PCT Pub. Date: Jun. 11, 2015

(65) Prior Publication Data
US 2016/0302142 A1 Oct. 13, 2016

(30) Foreign Application Priority Data

Dec. 3, 2013 (EP) .................................... 13195419
Jan. 30, 2014 (EP) .................................... 14153315

(51) Int. Cl.
*H04W 48/20* (2009.01)
*H04W 36/32* (2009.01)
(Continued)

(52) U.S. Cl.
CPC ............. *H04W 48/20* (2013.01); *H04W 4/06* (2013.01); *H04W 36/32* (2013.01); *H04W 48/04* (2013.01);
(Continued)

(58) Field of Classification Search
CPC ....... H04W 4/06; H04W 36/32; H04W 48/04; H04W 48/20; H04W 72/048; H04W 84/005
See application file for complete search history.

(56) References Cited

U.S. PATENT DOCUMENTS 6,256,500 B1 7/2001 Yamashita
8,374,620 B2 * 2/2013 Matsuzawa ........... H04W 16/12
370/328

(Continued)

FOREIGN PATENT DOCUMENTS

CN 102907140 A 1/2013
EP 2 424 321 A1 2/2012
(Continued)

OTHER PUBLICATIONS

[No Author Listed], 3GPP TS 25.304 V11.4.0. 3rd Generation Partnership Project; Technical Specification Group Radio Access Network. User Equipment (UE) procedures in idle mode and procedures for cell reselection in connected mode (Release 11). Sep. 2013.
(Continued)

*Primary Examiner* — Asad M Nawaz
*Assistant Examiner* — Kai Chang
(74) *Attorney, Agent, or Firm* — Tucker Ellis LLP

(57) ABSTRACT

The present invention relates to a method for selecting a cell of a wireless cellular communication network (100) having a plurality of cells (111-115). According to the method, a cell size information representing a size of an area served by a cell (111-115) of the plurality of cells is received by a user equipment (106). The received cell size information is transmitted from the user equipment (106) to a base station (105) of the wireless cellular communication network (100) by which the user equipment (106) is served. A cell (111-

(Continued)

115) of the plurality of cells is selected for serving the user equipment (106) based on the cell size information.

15 Claims, 2 Drawing Sheets

(51) Int. Cl.
H04W 4/06 (2009.01)
H04W 48/04 (2009.01)
H04W 72/04 (2009.01)
H04W 84/00 (2009.01)

(52) U.S. Cl.
CPC ........ *H04W 72/048* (2013.01); *H04W 84/005* (2013.01)

(56) References Cited

U.S. PATENT DOCUMENTS

| | | | |
|---|---|---|---|
| 9,307,502 B1 | 4/2016 | Tailor | |
| 9,374,773 B2 | 6/2016 | Cui | |
| 9,813,965 B1 | 11/2017 | Edara | |
| 2006/0128394 A1 | 6/2006 | Turina | |
| 2007/0218881 A1* | 9/2007 | Voyer | H04W 60/04 455/414.1 |
| 2008/0316961 A1* | 12/2008 | Bertrand | H04W 74/004 370/329 |
| 2010/0022250 A1* | 1/2010 | Petrovic | H04J 11/0093 455/450 |
| 2010/0128805 A1* | 5/2010 | Tanno | H04B 1/7083 375/260 |
| 2010/0254294 A1 | 10/2010 | Jerbi | |
| 2011/0124330 A1 | 5/2011 | Kojima | |
| 2011/0275378 A1 | 11/2011 | Kwon et al. | |
| 2011/0319081 A1 | 12/2011 | Deivasigamani | |
| 2012/0129532 A1 | 5/2012 | Lim et al. | |
| 2012/0195290 A1 | 8/2012 | Bienas | |
| 2012/0250578 A1 | 10/2012 | Pani | |
| 2012/0322449 A1* | 12/2012 | Shimizu | H04W 36/24 455/436 |
| 2013/0005344 A1* | 1/2013 | Dimou | H04W 36/0083 455/441 |
| 2013/0059589 A1 | 3/2013 | Dalsgaard et al. | |
| 2013/0084862 A1* | 4/2013 | Zou | H04W 64/00 455/436 |
| 2013/0084870 A1* | 4/2013 | Nylander | H04W 36/0061 455/436 |
| 2013/0084884 A1* | 4/2013 | Teyeb | H04W 48/04 455/456.1 |
| 2013/0100930 A1* | 4/2013 | Lee | H04W 60/005 370/331 |
| 2013/0229931 A1* | 9/2013 | Kim | H04W 24/10 370/252 |
| 2013/0244664 A1* | 9/2013 | Song | H04W 36/0083 455/437 |
| 2013/0303081 A1* | 11/2013 | Chang | H04W 36/0061 455/11.1 |
| 2014/0057635 A1 | 2/2014 | Sergeyev | |
| 2014/0064247 A1* | 3/2014 | Teyeb | H04W 36/0083 370/331 |
| 2014/0066074 A1 | 3/2014 | Folke | |
| 2014/0148174 A1* | 5/2014 | Teyeb | H04W 36/0083 455/441 |
| 2014/0153485 A1* | 6/2014 | Tsuda | H04W 48/04 370/328 |
| 2014/0162636 A1 | 6/2014 | Cui | |
| 2014/0162653 A1* | 6/2014 | Lee | H04W 36/0061 455/436 |
| 2014/0192781 A1* | 7/2014 | Teyeb | H04W 36/34 370/331 |
| 2014/0228057 A1* | 8/2014 | Uga | H04W 64/00 455/456.3 |
| 2014/0247806 A1 | 9/2014 | Fujimoto | |
| 2014/0274064 A1* | 9/2014 | Al-Shalash | H04W 24/08 455/437 |
| 2014/0335870 A1* | 11/2014 | Yilmaz | H04W 36/32 455/441 |
| 2015/0049681 A1* | 2/2015 | Huang | H04W 72/1289 370/329 |
| 2015/0087301 A1 | 3/2015 | Choudhary | |
| 2015/0131618 A1* | 5/2015 | Chen | H04W 16/02 370/332 |
| 2015/0208314 A1* | 7/2015 | Lorca Hernando | H04W 36/32 455/441 |
| 2015/0304928 A1* | 10/2015 | Lu | H04W 36/32 455/437 |
| 2015/0319686 A1* | 11/2015 | Hedberg | H04W 48/20 370/329 |
| 2015/0327198 A1* | 11/2015 | Axmon | H04W 56/0045 370/336 |

FOREIGN PATENT DOCUMENTS

| | | |
|---|---|---|
| EP | 2424321 | 2/2012 |
| WO | 2010133040 | 11/2010 |
| WO | WO 2013/025166 A1 | 2/2013 |
| WO | WO 2013/093575 A1 | 6/2013 |
| WO | WO 2013/113365 A1 | 8/2013 |

OTHER PUBLICATIONS

[No Author Listed], 3GPP TS 25.331 V111.7.0. 3rd Generation Partnership Project; Technical Specification Group Radio Access Network. Radio Resource Control (RRC). Protocol specification (Release 11). Sep. 2013.
[No Author Listed], Chapter 10.2.48 of 3GPP TS 25.331 V111.7.0. 3rd Generation Partnership Project; Technical Specification Group Radio Access Network. Radio Resource Control (RRC). Protocol specification (Release 11). Sep. 2013.
[No Author Listed], 3GPP TS 36.331 V11.5.0. 3rd Generation Partnership Project; Technical Specification Group Radio Access Network. Evolved Universal Terrestrial Radio Access (E-UTRA). Radio Resource Control (RRC). Protocol specification (Release 11). Sep. 2013.
[No Author Listed], Chapter 5.2.2 of 3GPP TS 36.331 V11.5.0. 3rd Generation Partnership Project; Technical Specification Group Radio Access Network. Evolved Universal Terrestrial Radio Access (E-UTRA). Radio Resource Control (RRC). Protocol specification (Release 11). Sep. 2013.
International Search Report and Written Opinion dated Aug. 12, 2015 for Application No. PCT/EP2014/075495.
English Translation of Search Report from China National IP Administration; Appl. No. 201480065509.2; Appl. dated Oct. 27, 2014; Applicant: Sony Corporation.

\* cited by examiner

SELECTING A CELL OF A WIRELESS CELLULAR COMMUNICATION NETWORK

CROSS-REFERENCE TO RELATED APPLICATION

This application is the National Phase under 35 U.S.C. § 371 of PCT International Application No. PCT/EP2014/075495, filed Nov. 25, 2014, which claims priority to European Application No. 14153315.8, filed Jan. 30, 2014; and European Application No. 13195419.0, filed Dec. 3, 2013, the entire contents of the aforementioned applications are hereby incorporated herein by reference.

FIELD OF THE INVENTION

The present invention relates to a method for selecting a cell of a wireless cellular communication network having a plurality of cells, and especially to a method for selecting a cell considering a cell size information of the plurality of cells. The present invention relates furthermore to a user equipment and a base station configured to perform the method.

BACKGROUND OF THE INVENTION

The demand for mobile data and voice communication continues to grow. To meet the increasing demand, wireless communication systems may provide for example cellular-based wireless communication networks which have a plurality of cells. To further meet increasing demands for mobile data and voice communication under conditions where the user equipment travels, additionally mobile base stations and mobile repeater relays may be provided. Mobile base stations and mobile repeater relays may be installed in public transportation vehicles, such as trains, buses, subway trains, or other vehicles, without being limited thereto.

Due to the large variety of stationary and mobile base stations and repeater relays, a cell size of the base stations may very significantly. The cell size may be defined as the size of a geographical area which is covered by the base station or repeater relay to serve a user equipment or terminal device located therein. When the terminal device or user equipment, for example a mobile phone or a mobile computer, is moving, a cell reselection may be needed when the user equipment is leaving a cell served by a mobile or stationary base station or repeater relay. Such a reselection of a cell may also be called handover. However, frequent handovers are unwanted due to an increasing administrative and signaling overhead occurring at each handover and potential risks of data traffic interruptions or dropouts during the handover. Further reasons to avoid a cell reselection may include the resultant decrease in bandwidth which is available for data and voice communication, or the increase in power consumption associated with the additional signaling involved in the cell reselection.

Therefore, there is a need to address at least some of the shortcomings of conventional cell selection techniques. Especially, there is a need for methods and devices which mitigate the risk that the user equipment is served by a base station for only a short time period before a next handover is needed.

SUMMARY OF THE INVENTION

According to the present invention, this object is achieved by a method for selecting a cell of a wireless cellular communication network, a method for selecting a cell of a wireless cellular communication network, a user equipment for a wireless cellular communication network, a base station for a wireless cellular communication network, a base station for a wireless cellular communication network, and a method for selecting a cell for serving a user equipment of a wireless cellular communication network having a plurality of cells. The dependent claims define preferred and advantageous embodiments of the invention.

According to an embodiment, a method for selecting a cell of a wireless cellular communication network having a plurality of cells is provided. According to the method, cell size information is received by the user equipment. The cell size information represents a size of an area served by a cell of the plurality of cells. The cell size information may comprise or may be indicated by for example a radio power value utilized by a base station of the cell, or a relative radio power value indicating for example one of the plurality of predefined utilized radio power value ranges. The utilized radio power value may be provided in a commonly known dimension, for example in dBm or W. The relative radio power value may comprise for example an integer value indicating in which radio power value range of the predefined radio power value ranges the utilized radio power value of the base station is. For example, eight different radio power value ranges may be provided such that the relative radio power value is a simple integer in the range from 0-7 and may be transmitted to the user equipment as 3 bits thus reducing the amount of signaling needed for transmitting the cell size information to the user equipment. Furthermore, the cell size information may comprise for example a geometric size value of the cell, for example in meters, or a relative cell size value indicating one of a plurality of predefined geometric cell size value ranges. As described above in connection with the relative radio power value, the relative cell size value may comprise a simple integer providing a rough estimation of the size of the cell. For example, four cell size value ranges may be defined, for example a first one representing a range from 0-5 meters, a second one representing a range from 5-500 meters, a third one representing a range from 500-5000 meters and a fourth one representing a range of 5000 meters and beyond. Therefore, the relative cell size value provides a compact representation of the cell size information, for example in only 2 bits to be transmitted to the user equipment. According to the method, the received cell size information is transmitted from the user equipment to a base station of the wireless cellular communication network by which the user equipment is served. In other words, the user equipment may receive and collect cell size information from a plurality of cells including for example the cell in which the user equipment currently resides as well as neighboring cells. All this information may be transmitted to the base station belonging to the cell at which the user equipment resides, i.e. the base station by which the user equipment is currently served or registered at. Based on the cell size information a cell of the plurality of cells for serving the user equipment is selected, for example for a next handover. By considering the cell size information of for example neighboring cells, the cell reselection may be optimized, for example by avoiding entering a very small cell although for example the signal intensity provided by this small cell may be the most appropriate.

According to an embodiment, the cell size information is received from a base station of a cell of the plurality of cells which broadcasts the cell size information. By broadcasting the cell size information, each base station may publish its cell size information to every user equipment within its transmission range without having to know which user equipments are present. Furthermore, no additional signaling is needed to receive the cell size information at the user equipment.

According to an embodiment, the step of selecting a cell of the plurality of cells may be performed by the base station by the which the user equipment is currently served. As the base station may receive cell size information from a plurality of user equipments arranged in its cell, the base station may select for each user equipment an adequate cell if a handover is required or advantageous. However, additionally or as an alterative, the base station may only make a proposal for a cell to select for a user equipment and may transmit this proposal to the user equipment. Furthermore, as an alternative or additionally, the user equipment may collect the received cell size information and may perform the cell selection on its own, for example in case a handover is required or is assumed to be advantageous.

The base station from which the user equipment receives the cell size information as well as the base station to which the user equipment transmits the received cell size information may comprise a stationary base station, a mobile base station or a mobile or stationary repeater. Therefore, whenever in the present description the term "base station" is used, all the above-mentioned types of base stations are intended to be included unless specifically noted otherwise.

According to another embodiment, the method comprises furthermore the step of receiving, by the user equipment, mobility information representing a time-dependent location change of the cell of the plurality of cells, and transmitting the received mobility information from the user equipment to the base station by which the user equipment is served. A cell of the plurality of cells for serving the user equipment (in the future) is selected additionally based on the mobility information.

The mobility information may be received from a base station of the cell of the plurality of cells which broadcasts the mobility information. The mobility information may comprise for example information on a current velocity of a movement of the base station or the cell, information on a current direction of a movement of the base station or the cell, or information on a current position of the base station.

According to a further embodiment, a user equipment mobility information is determined which represents a time-dependent location change of the user equipment. The user equipment mobility information is transmitted from the user equipment to the base station by which the user equipment is served, and a cell of the plurality of cells for serving the user equipment is selected based additionally on the user equipment mobility information. For example, a relative mobility information representing a time-dependent relative location change between the user equipment and the cell may be determined by the user equipment based on the user equipment mobility information and the mobility information of the cell. The relative mobility information may be transmitted from the user equipment to the base station by which the user equipment is served, and a cell of the plurality of cells for serving the user equipment may be selected additionally based on the relative mobility information. Based on the mobility information of the user equipment and the cells or base stations of the communication network in combination with the cell sizes, a comprehensive cell selection may be performed. For example, when the user equipment is moving and a small cell is in reach of the user equipment and moving approximately in the same direction, the user equipment may select this cell for communication services. As long as both are moving in the same direction with the same velocity, no handover may be needed. Furthermore, in case for example the user equipment is moving very fast and no accompanying mobile cells are available, a large cell may be selected to avoid frequent handovers, although smaller cells providing higher signal intensity than the large cell may be available.

According to an embodiment, the cell size information, the mobility information of the cells, the user equipment mobility information and/or the relative mobility information may be transmitted from the user equipment to the base station as part of a so-called system information block SIB. In current technical specifications for cellular communication networks, for example in 3GPP TS 36.331, entitled "$3^{rd}$ Generational Partnership Project, Technical Specification Group Radio Access Network; Radio Resource Control (RRC); Protocol Specification (Release 11)", the user equipments are expected to report neighbor cell measurements of identified neighbor cells via a system information block SIB. In the radio resource control (RRC) measurement reports, the additional information concerning cell size and mobility may be denoted as extended measurement reporting and could be reported within the SIB data.

According to an embodiment, the cell of the plurality of cells comprises at least one of a neighboring cell representing a cell arranged adjacent to the cell of the base station currently serving the user equipment. However, the cell size information and the cell mobility information collected by the user equipment is not restricted to information from neighboring cells, but may include also cell size information and cell mobility information of cells in a larger distance from which the information is received by the user equipment, or may include information of cells in which the user equipment resided in the past or from which information has been received in the past.

According to another embodiment, a further method method for selecting a cell of a wireless cellular communication network having a plurality of cells is provided. The method comprises the steps of receiving, by a user equipment, mobility information representing a time-dependent location change of the cell of the plurality of cells, transmitting the received mobility information from the user equipment to a base station of the wireless cellular communication network by which the user equipment is served, and selecting a cell of the plurality of cells for serving the user equipment based on the mobility information. The mobility information may be received from a base station of the cell of the plurality of cells which broadcasts the mobility information. The mobility information may comprise for example information on a current velocity of a movement of the base station or the cell, information on a current direction of a movement of the base station or the cell, or information on a current position of the base station.

According to an embodiment, a user equipment for a wireless cellular communication network is provided. The wireless cellular communication network comprises a plurality of cells. Each cell may be served by a least one base station, which may be mobile or stationary. The user equipment may be connected to one of the base stations and in response thereto, the base station provides a data or voice communication for the user equipment. The user equipment comprises a receiver unit configured to receive cell size information representing a size of an area served by a cell of the plurality of cells. The cell size information may be broadcasted from base stations of the plurality of cells. The cell size information may be broadcast from the base station to which the user equipment is connected and from other base stations of other cells, for example, neighboring cells, to which the user equipment is currently not connected. The user equipment comprises furthermore a transmitter unit configured to transmit the received cell size information from the user equipment to the base station to which the user equipment is currently connected, i.e., by which the user equipment is currently served. As the cell size information has been collected from a plurality of cells, a plurality of cell size information may be transmitted to the base station, and the base station may use the cell size information to select a cell to which the user equipment may connect in the future in case the radio link communication between the user equipment and the currently serving base station becomes weak or in case of other conditions, for example for balancing traffic load. By considering the cell size for selecting a next cell to reside on, frequent handovers may be avoided and therefore system signaling may be reduced.

According to a further embodiment, a user equipment for a wireless cellular communication network comprising a plurality of cells is provided. Each cell may be served by a least one base station, which may be mobile or stationary. The user equipment may be connected to one of the base stations. The user equipment comprises a receiver unit configured to receive mobility information representing a time-dependent location change of a cell of the plurality of cells. The mobility information may be broadcasted from base stations of the plurality of cells. The mobility information may be broadcast from the base station to which the user equipment is connected and from other base stations of other cells, for example, neighboring cells, to which the user equipment is currently not connected. The user equipment comprises furthermore a transmitter unit configured to transmit the received mobility information from the user equipment to the base station to which the user equipment is currently connected. As the mobility information has been collected from a plurality of cells, a plurality of mobility information may be transmitted to the base station, and the base station may use the mobility information to select a cell to which the user equipment may connect in the future in case the radio link communication between the user equipment and the currently serving base station becomes weak or in case of other conditions, for example for balancing traffic load. By considering the mobility for selecting a next cell to reside on, frequent handovers may be avoided and therefore system signaling may be reduced.

According to an embodiment, the user equipment comprises furthermore a processing device which is configured to perform the above-described method. Therefore, the user equipment comprises also the advantages described above.

According to another embodiment, a base station for a wireless cellular communication network is provided. The wireless cellular communication network may comprise a plurality of cells, wherein each cell is served by at least one corresponding base station, which may be mobile or stationary. Furthermore, a cell may be served by a stationary or mobile repeater relay. The base station comprises a receiver unit configured to receive cell size information from a user equipment which is served by the base station. For example, after the user equipment has connected to the base station and registered at the base station, a plurality of cell size information of a plurality of cells collected by the user equipment may be transmitted to the base station. The cell size information represents a size of an area served by a cell of the plurality of cells. The cell size information may comprise a plurality of cell size information relating to neighboring cells. The base station comprises furthermore a processing device which is configured to select, based on the received cell size information, one of the plurality of cells to be used for serving the user equipment in the future, for example when the current radio link between the user equipment and the base station becomes weak or it is desired that the user equipment is served by another cell due to load balancing. By considering the cell size information at the process for selecting a new cell for the user equipment, the new cell for the user equipment may be selected such that it is expected that the user equipment will reside at the new cell for a longer time, such that frequent handovers may be avoided and a signaling overhead may be reduced. Especially, the cell size information may be used in combination with mobility information of the cells and the user equipment as described above, for further enhancing the cell selection process. Therefore, according to an embodiment, the base station may additionally be configured to perform the above-described method and comprises therefore also the above-described advantages.

According to an embodiment, a base station for a wireless cellular communication network which comprises a plurality of cells is provided. Each cell is served by at least one corresponding base station, which may be mobile or stationary. The base station comprises a receiver unit configured to receive mobility information from a user equipment which is served by the base station. For example, after the user equipment has connected to the base station and registered at the base station, a plurality of mobility information of a plurality of cells collected by the user equipment may be transmitted to the base station. The mobility information represents a time-dependent location change of a cell of the plurality of cells. The mobility information may comprise a plurality of mobility information relating to neighboring cells. The base station comprises furthermore a processing device which is configured to select, based on the received mobility information, one of the plurality of cells to be used for serving the user equipment in the future, for example when the current radio link between the user equipment and the base station becomes weak or it is desired that the user equipment is served by another cell due to load balancing. By considering the mobility information at the process for selecting a new cell for the user equipment, the new cell for the user equipment may be selected such that it is expected that the user equipment will reside at the new cell for a longer time, such that frequent handovers may be avoided and a signaling overhead may be reduced.

According to another embodiment, a base station for a wireless cellular communication network is provided. The base station comprises a processing device configured to determine a cell size information representing a size of an area of a cell of the plurality of cells which is served by the base station. In other words, the processing device is configured to determine a cell size of the cell served by itself. The cell size information may be determined based on currently utilized radio power or may be predefined for example for a stationary base station, for example in terms of a diameter of the cell. The base station comprises furthermore a transmitter unit configured to broadcast the determined cell size information. By broadcasting the determined cell size information, a plurality of user equipments may be reached and therefore performing the above-described method within the wireless cellular communication network is enabled.

According to another embodiment of the present invention, the cell size information and/or the mobility information of one base station may be transmitted to another base station directly without involving a user equipment. Based on the received cell size information and/or the mobility information a future cell for serving a user equipment currently served by the other base station may be selected. In other words, information such as mobility information and/or cell size information may also be transferred directly from one base station to another base station in case there is a direct link between them. Such a link and protocol has been standardized in 3GPP and is called X2 interface.

Although specific features described in the above summary and the following detailed description are described in connection with specific embodiments of the present invention, it should be understood that the features of the exemplary embodiments may be combined with each other unless specifically noted otherwise. For example, a base station may comprise the above-described capability to receive the cell size information and to select a next cell for the user equipment as well as the capability to determine its own cell size and to broadcast its cell size.

BRIEF DESCRIPTION OF THE DRAWINGS

The present invention will now be described in more detail with reference to the accompanying drawings.

DETAILED DESCRIPTION OF PREFERRED EMBODIMENTS

In the following, exemplary embodiments of the invention will be described in more detail. It is to be understood that the features of the various exemplary embodiments described herein may be combined with each other unless specifically noted otherwise. Same reference signs in the various drawings refer to similar or identical components. Any coupling between components or devices shown in the figures may be a direct or indirect coupling unless specifically noted otherwise.

Figure 1:
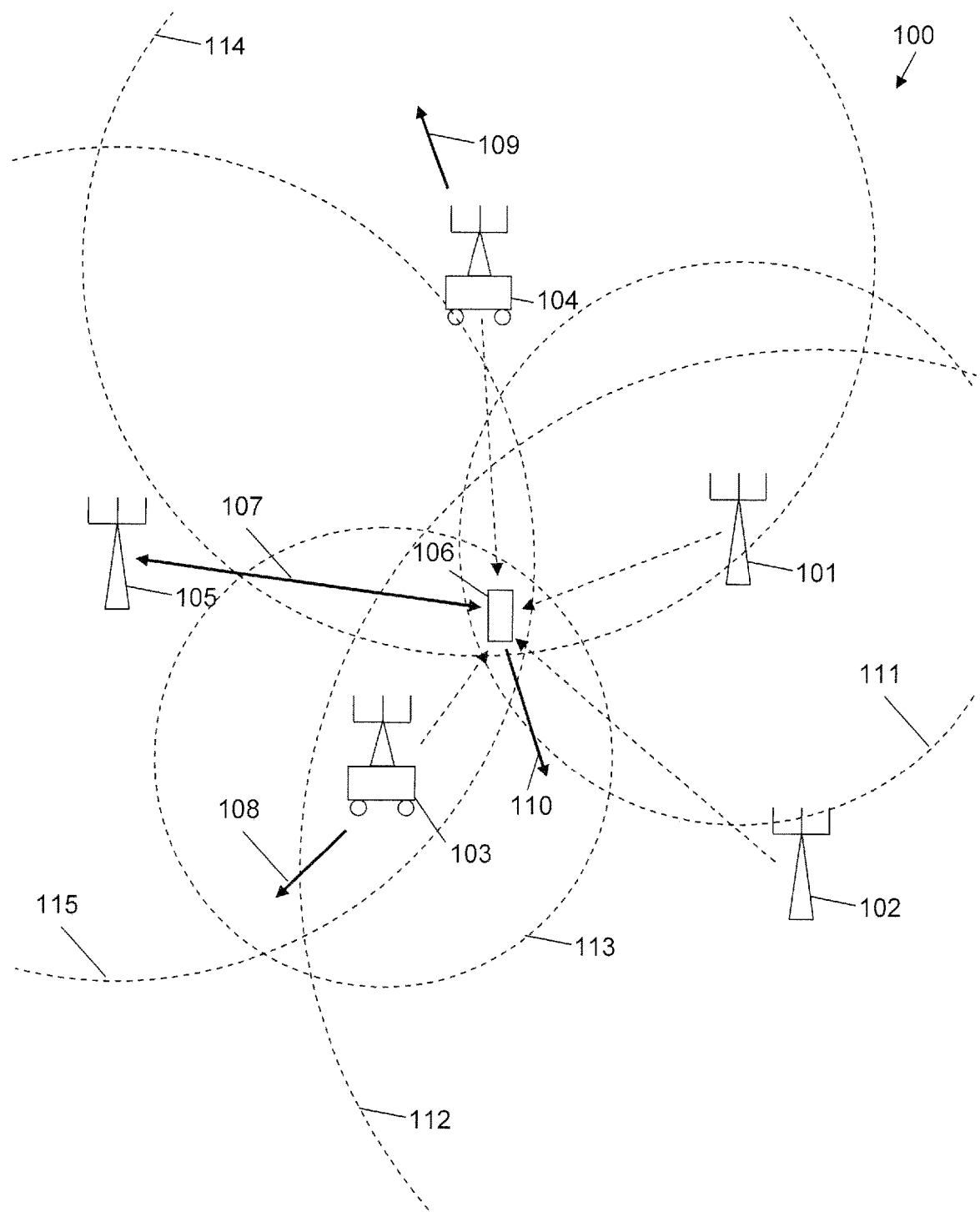
FIG. 1 shows schematically a wireless cellular communication network comprising a plurality of stationary and mobile base stations as well as a user equipment according to embodiments of the present invention.

FIG. 1 shows a wireless cellular communication network 100, for example an access network according to GSM (Global System for Mobile Communication), UMTS (Universal Mobile Telecommunication System), WCDMA (Wideband Code Division Multiple Access) or LTE (Long Term Evolution) defined in 3GPP ($3^{rd}$ Generation Partnership Project) or future 5G. The wireless cellular communication network 100 comprises a stationary first base station 101, a stationary second base station 102, a mobile third base station 103, a mobile fourth base station 104, and a stationary fifth base station 105. Furthermore, a user equipment 106 is arranged in the wireless cellular communication network 100 such that it may receive at least broadcasted data from the base stations 101-104, and such that it may set up a communication link 107 to the base station 105. The ability to receive broadcasted data is indicated in FIG. 1 by the dashed arrows. The mobile third base station 103 is moving in a direction indicated by arrow 108, the mobile fourth base station 104 is moving in a direction indicated by arrow 109, and the user equipment 106 is moving in a direction indicated by arrow 110.

To each of the base stations 101-105 is assigned a corresponding cell 111-115. The cells 111-115 are indicated in FIG. 1 by the dashed curved or circular lines. In detail, cell 111 is assigned to base station 101, cell 112 is assigned to base station 102, cell 113 is assigned to base station 103, cell 114 is assigned to base station 104, and cell 115 is assigned to base station 105. Due to the movement of the base stations 103 and 104, the cells 113 and 114 are also moving in the directions indicated by arrows 108 and 109.

As indicated by arrow 107, the user equipment 106 is currently connected to and served by the base station 105. However, as can be seen from the cells 111-114, the user equipment 106 may also be served by any of the base stations 101-104 in case a cell reselection is needed.

Figure 2:
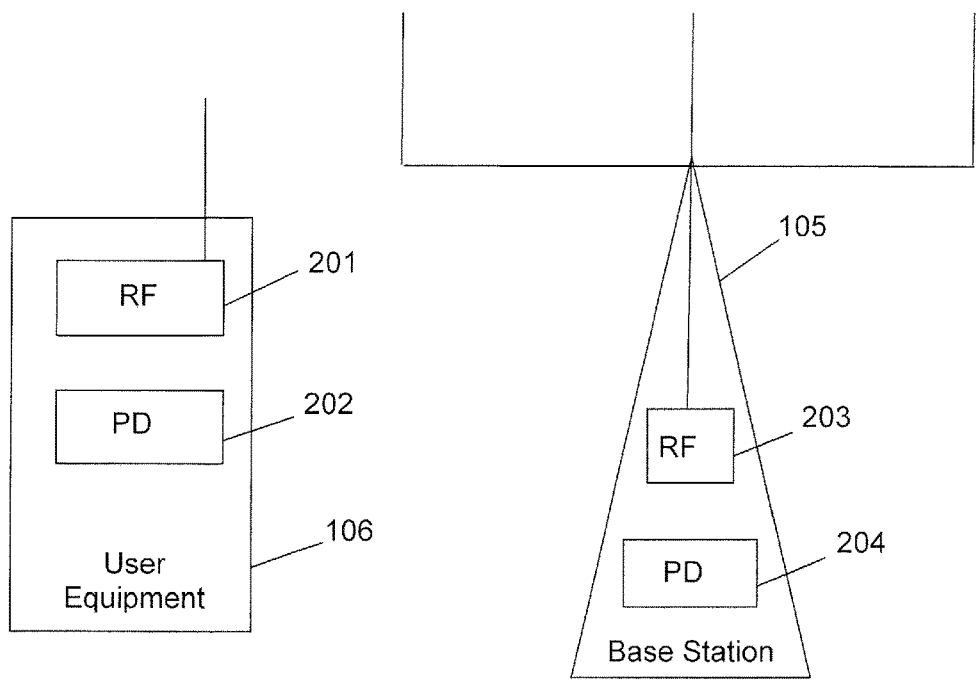
FIG. 2 shows schematically a user equipment and a base station according to embodiments of the present invention.

FIG. 2 shows the user equipment 106 and the base station 105 in more detail. The base stations 101-104 may have a similar or identical structure as base station 105. The user equipment 106 comprises a radio frequency interface (RF) 201 and a processing device (PD) 202. The radio frequency interface 201 may comprise a receiver unit and a transmitter unit configured to communicate wirelessly with any of the base stations 101-105. Operation of the processing device 202 will be described in connection with the method shown in FIG. 3 in more detail.

The base station 105 comprises a wireless radio frequency interface (RF) 203 and a processing device (PD) 204. The wireless radio frequency interface 203 may comprise a receiver unit and a transmitter unit for communicating wirelessly with the user equipment 106. Operation performed by the processing device 204 will be described in more detail in connection with FIG. 3 below.

Figure 3:
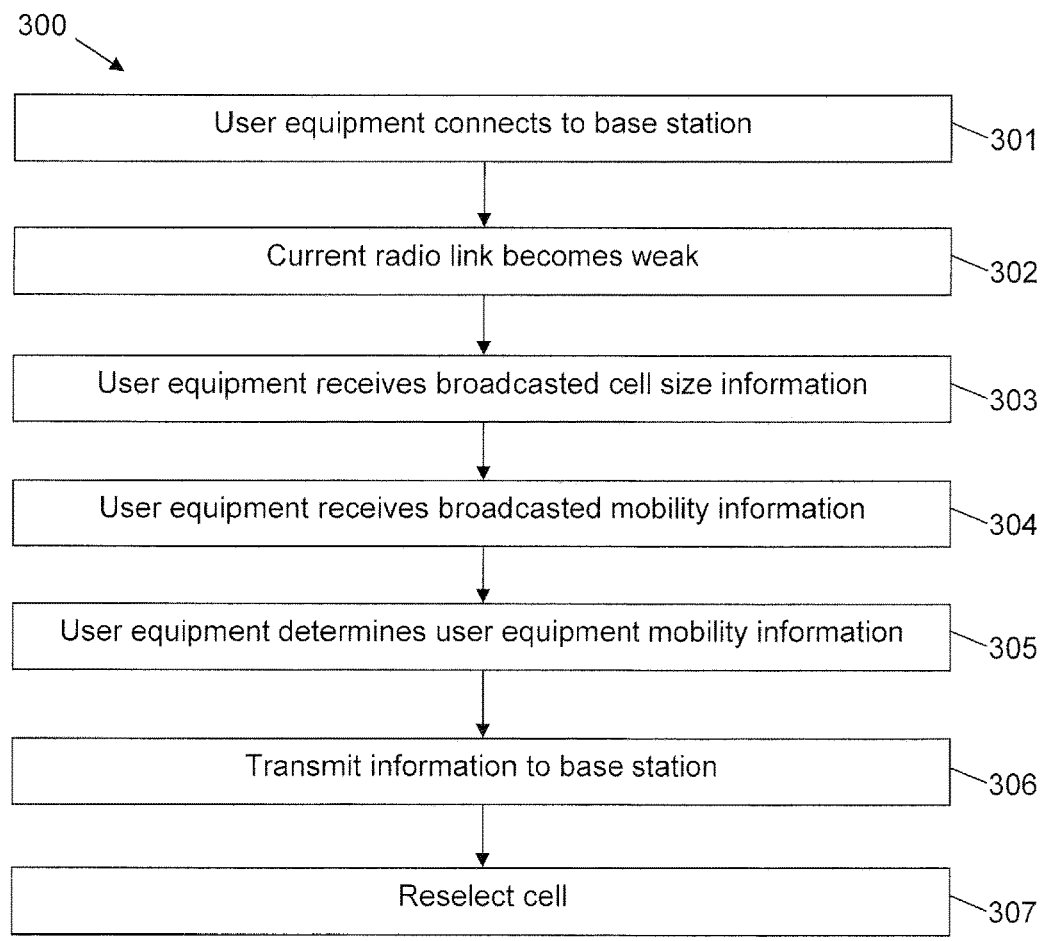
FIG. 3 shows a method for selecting a cell of a wireless cellular communication network according to an embodiment of the present invention.

FIG. 3 shows a method 300 comprising method steps 301-307. In step 301 the user equipment 106 connects to the base station 105, and therefore a communication link for transmitting payload data between the user equipment 106 and the base station 105 may be established. In step 302 the base station 105 or the user equipment 106 may determine that the current radio transmission link 107 between the user equipment 106 and the base station 105 becomes weak and therefore a cell reselection may be necessary. However, this is only an example and other conditions may trigger a cell reselection, for example an "off load decision from the base station" may initiate the user equipment to scan for an alternative base station. In step 303 the user equipment receives broadcasted cell size information from for example the base stations 101-104, as indicated by the dashed arrows in FIG. 1. Furthermore, in step 304, the user equipment 106 receives broadcasted mobility information from the base stations 101-104. The mobility information may comprise for example for the base station 101 that the base station 101 is a stationary base station, and for base station 104 that the base station 104 is a mobile base station moving in the direction of arrow 109 with a certain speed. The cell size information as well as the mobility information may comprise additionally a current position of the corresponding base station. In step 305 the user equipment 106 determines its own position and mobility information comprising for example a direction and a current speed of its movement 110. The thus collected cell size information and cell mobility information as well as the user equipment mobility information is transmitted in step 306 to the base station 105. Based on this information the base station 105 may select in step 307 a new cell to which the user equipment 106 should try to connect to.

In the arrangement shown in FIG. 1, the base station 105 may for example propose for the user equipment 106 to connect to base station 102 although in the current situation the base stations 101 and 103 may provide a higher signal strength and therefore may provide a better transmission quality. However, the base station 102 provides a very large cell 112 and, if the user equipment 106 continues to move in the direction 110, it will reside for a long time within the cell 112. In contrast to this, due to the movement of the mobile base station 103, the user equipment 106 will be moving rapidly out of the moving cell 113 such that a further handover would be necessary if the user equipment 106 is connected to the mobile base station 103. Likewise, the user equipment 106 would be moving out of the cell 111 in short time. Therefore, by considering the cell size information as well as the mobility information, frequent handovers may be avoided and thus signaling overhead may be reduced.

Although not shown in the figures, the user equipment 106 may be connected to two or more base stations simultaneously, for example in case of carrier aggregation or in a distributed MIMO scenario. In such scenario the user equipment may select to stay with one of the base stations and to re-select only the other, e.g. based on the size information. Alternatively, the user equipment may drop connection to both base stations and reselect two other base stations to register at.

As described above, the cell size information and the mobility information may be broadcasted from each of the base stations 101-105 to the user equipment 106 and may be transmitted from the user equipment 106 to the base station 105 at which the user equipment 106 is currently registered. The cell size information as well as the mobility information may be transmitted as direct information, for example indicating the diameter of a cell 111-115 served by the corresponding base station 101-105, or for example as a current velocity with which the cell or base station is moving and a geographic direction in which the cell or base station is moving. However, as an alterative, relative mobility information and relative cell size information may be transmitted. For example, a plurality of cell size ranges may be defined representing for example a small range up to 10 meters, a medium range from 10 meters to 500 meters, a large range from 500 meters to 2000 meters, and a very large range of 2000 meters and beyond. Then, only a relative information indicating either small, medium, large or very large has to be transmitted, which may be coded within a few bits to be transmitted. Thus, a communication overhead for broadcasting the cell size information and the mobility information and for transmitting the collected cell size information and mobility information from the user equipment 106 to the base station 105 may be reduced.

The cell size information as well as the mobility information may be transmitted as part of a system information block (SIB) signaling, for example, as a new specified optional system information block to be defined for example for LTE in 3GPP TS 36.331. The user equipments in the wireless cellular communication network are expected during neighbor cell measurements to report observations of the identified neighbor cells. The additional information elements, for example the cell size information and the mobility information, could be requested to be included in radio resource control (RRC) measurement reports, possibly denoted as "extended measurement reporting". This signaling could be used to report the received SIB data for one or more detected neighbor cells. The RRC measurements are also specified for LTE in TS 36.331.

The user equipment 106 may also use the broadcasted cell mobility information to produce for example a relative mobility information that could be reported in the extended measurement reports. The relative mobility information may indicate a relative mobility between the user equipment and the detected neighbor cell. With this information a base station cell selection can be done to handle for example mobility towards cells that are moving in the same direction as the terminal, in order to reduce the system signaling overhead due to handovers. To sum up, the proposed concept of additional neighbor cell measurement reporting including information about other cell mobility as well as cell size, allows to achieve improved base station mobility control.

The invention claimed is:

1. A method for selecting a cell of a wireless cellular communication network having a plurality of cells, the method comprising:
   receiving, by a user equipment, cell size information representing a size of an area served by a cell of the plurality of cells,
   transmitting the received cell size information from the user equipment to a base station of the wireless cellular communication network by which the user equipment is served,
   receiving, by the user equipment, mobility information representing a time-dependent location change of the cell of the plurality of cells,
   transmitting the received mobility information from the user equipment to the base station by which the user equipment is served, and
   selecting, by the base station by which the user equipment is served, a cell of the plurality of cells for serving the user equipment based on the cell size information and the mobility information.

2. The method according to claim 1, wherein the cell size information comprises at least one of a group consisting of:
   a utilized radio power value of a base station of the cell,
   a relative radio power value indicating one of a plurality of predefined utilized radio power value ranges,
   a geometric size value of the cell, and
   a relative cell size value indicating one of a plurality of predefined geometric cell size value ranges.

3. The method according to claim 2, wherein the step of receiving the cell size information comprises receiving the cell size information from a base station of the cell of the plurality of cells which broadcasts the cell size information.

4. The method according to claim 1, wherein the step of receiving the cell size information comprises receiving the cell size information from a base station of the cell of the plurality of cells which broadcasts the cell size information.

5. The method according to claim 1, wherein the step of receiving the mobility information comprises receiving the mobility information from a base station of the cell of the plurality of cells which broadcasts the mobility information.

6. The method according to claim 1, wherein the mobility information comprises at least one of a group consisting of:
   information on a current velocity of a movement of a base station of the cell,
   information on a current direction of a movement of the base station of the cell, and
   information on a current position of the base station of the cell.

7. The method according to claim 1, wherein the cell of the plurality of cells comprises at least one of a neighboring cell representing a cell arranged adjacent to the cell of the base station serving the user equipment.

8. A method for selecting a cell of a wireless cellular communication network having a plurality of cells, the method comprising:
   receiving, by a user equipment, cell size information representing a size of an area served by a cell of the plurality of cells, transmitting the received cell size information from the user equipment to a base station of the wireless cellular communication network by which the user equipment is served, determining user equipment mobility information representing a time-dependent location change of the user equipment, transmitting the user equipment mobility information from the user equipment to the base station by which the user equipment is served, and selecting, by the base station by which the user equipment is served, a cell of the plurality of cells for serving the user equipment based on the cell size information and the user equipment mobility information.

9. The method according to claim 8, further comprising:

receiving, by the user equipment, mobility information representing a time-dependent location change of the cell of the plurality of cells, determining, by the user equipment, relative mobility information representing a time-dependent relative location change between the user equipment and the cell based on the user equipment mobility information and the mobility information of the cell, transmitting the relative mobility information from the user equipment to the base station by which the user equipment is served, and selecting a cell of the plurality of cells for serving the user equipment based on the relative mobility information.

10. The method according to claim 9, wherein at least one of the cell size information, mobility information, user equipment mobility information, and relative mobility information is transmitted from the user equipment to the base station as part of a system information block, SIB.

11. A user equipment for a wireless cellular communication network having a plurality of cells, the user equipment comprising:

a receiver unit configured to receive cell size information representing a size of an area served by a cell of the plurality of cells and to receive mobility information representing a time-dependent location change of the cell of the plurality of cells, and a transmitter unit configured to transmit the received cell size information and the received mobility information from the user equipment to a base station of the wireless cellular communication network by which the user equipment is served for selection, by the base station by which the user equipment is served, of a cell of the plurality of cells for serving the user equipment based on the cell size information and the mobility information.

12. The user equipment according to claim 11, further comprising:

a processing device configured to control operation of the receiver unit and the transmitted unit.

13. A base station for a wireless cellular communication network having a plurality of cells, the base station comprising:

a receiver unit configured to receive cell size information from a user equipment served by the base station, wherein the cell size information represents a size of an area served by a cell of the plurality of cells, and configured to receive, from the user equipment, mobility information representing a time-dependent location change of the cell of the plurality cells, and a processing device configured to select a cell of the plurality of cells for serving the user equipment based on the cell size information and the mobility information.

14. A user equipment for a wireless cellular communication network having a plurality of cells, the user equipment comprising:

a receiver unit configured to receive cell size information representing a size of an area served by a cell of the plurality of cells, a processing device configured to determine user equipment mobility information representing a time-dependent location change of the user equipment, and a transmitter unit configured to transmit the received cell size information and the determined user equipment mobility information from the user equipment to a base station of the wireless cellular communication network, by which the user equipment is served, for selection by the base station, by which the equipment is server, of a cell of the plurality of cells for serving the user equipment based on the cell size information and the user equipment mobility information.

15. A base station for a wireless cellular communication network having a plurality of cells, the base station comprising:

a receiver unit configured to receive cell size information from a user equipment served by the base station, wherein the cell size information represents a size of an area served by a cell of the plurality of cells, and configured to receive, from the user equipment, user equipment mobility information representing a time-dependent location change of the user equipment, and a processing device configured to select a cell of the plurality of cells for serving the user equipment based on the cell size information and the user equipment mobility information.

* * * * *